No. 729,375. PATENTED MAY 26, 1903.
H. N. MARVIN & H. CASLER.
MOVING PICTURE APPARATUS.
APPLICATION FILED MAR. 28, 1902.
NO MODEL. 2 SHEETS—SHEET 1.
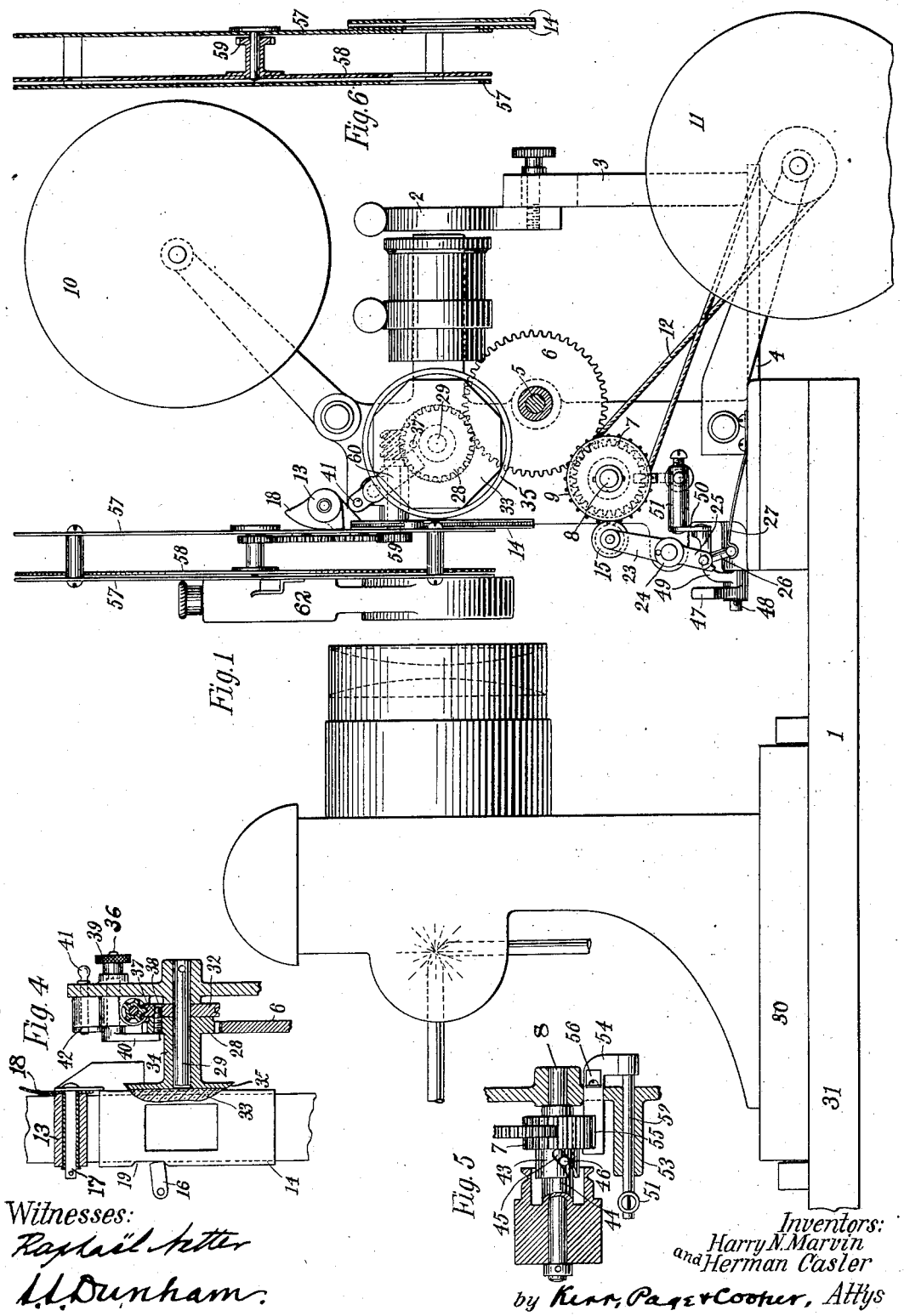
Witnesses:
Inventors:
Harry N. Marvin
and Herman Casler
by Kerr, Page & Cooper, Att'ys No. 729,375. PATENTED MAY 26, 1903.
H. N. MARVIN & H. CASLER.
MOVING PICTURE APPARATUS.
APPLICATION FILED MAR. 28, 1902.
NO MODEL. 2 SHEETS—SHEET 2.
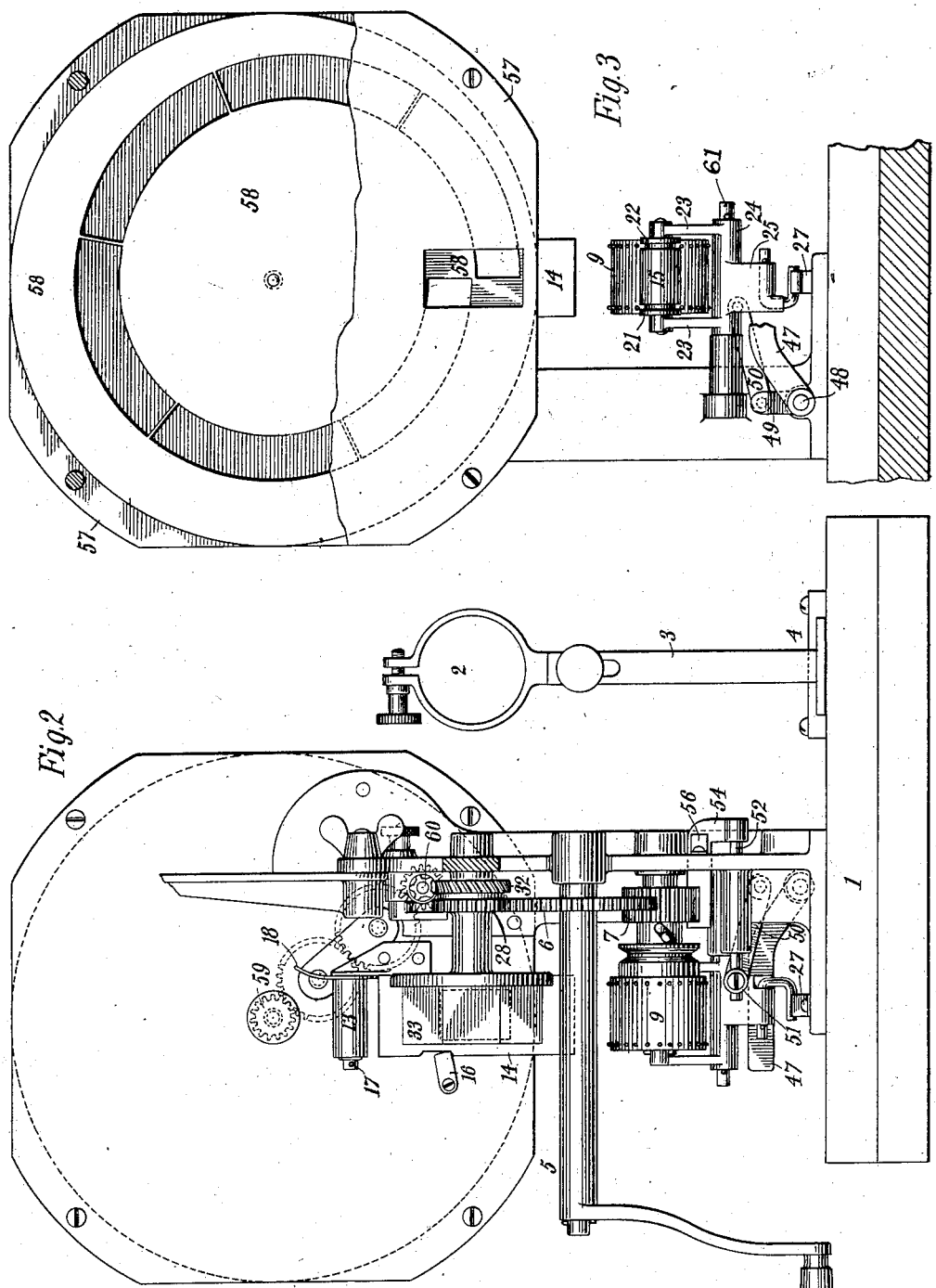
Witnesses:
Inventors:
Harry N. Marvin
and Herman Casler
by Kerr, Page & Cooper, Att'ys No. 729,375.

Patented May 26, 1903.

UNITED STATES PATENT OFFICE.

HARRY N. MARVIN AND HERMAN CASLER, OF CANASTOTA, NEW YORK.

MOVING-PICTURE APPARATUS.

SPECIFICATION forming part of Letters Patent No. 729,375, dated May 26, 1903.

Application filed March 28, 1902. Serial No. 100,374. (No model.)

*To all whom it may concern:*

Be it known that we, HARRY N. MARVIN and HERMAN CASLER, citizens of the United States, residing at Canastota, in the county of Madison and State of New York, have invented certain new and useful Improvements in Moving-Picture Apparatus, of which the following is a specification, reference being had to the drawings accompanying and forming a part of the same.

The invention which forms the subject of our present application is an improvement in apparatus primarily designed for exhibiting a series of pictures representing successive phases of motion in such manner, rate, and order of succession as to produce the illusion of an animated picture.

Our improved apparatus belongs to the general class of picture-exhibiting machines in which a surface bearing a series of pictures of successive phases of motion is continuously moved to bring the pictures successively into view or into the field of a projecting lens and in which one or more lenses, prisms, or reflecting-surfaces are moved in unison with the picture-surface and by means of which the rays of light from each picture as it moves across the field are focused at a single point or projected upon the same part of a screen. In machines of this class each picture or a portion thereof is visible from the time it enters until it leaves the field; but as it is in constant motion the interposition between it and the eye of the observer of some compensating device, such as a lens, a prism, or an angularly-disposed reflecting-surfaces having a similar effect, is necessary in order that the projecting image of the moving picture shall appear stationary and each succeeding image superposed upon that preceding it. The principles of construction and operation of such machines have long been known chiefly through the French patent to DuCos, No. 61,796, dated March 1, 1864, and British patent to Reynaud, No. 4,244, dated November 13, 1877.

In carrying out our invention we employ a picture-bearing surface of any kind suitable for the purpose, either flexible or rigid and transparent or opaque, according as the special construction of the apparatus may adapt it for direct view or for projection. As this surface, moreover, is moved continuously and not intermittently, it may be of any weight desired, and is not required to possess the same degree of tensile strength necessary in the machines as now ordinarily constructed. We prefer to use as a picture-bearing surface a long strip or band of ordinary photographic film, and in order to pass it across the field unwind it from one spool or reel while winding it on another.

In order to project the magnified images of the pictures on a screen, we employ a powerful source of light, such as an arc-lamp, a condenser, and an objective of the general character of those used in projecting-lanterns, and that the image of each picture shall be projected upon the same part of the screen and the successive images properly superposed we mount a prism between the picture-band and the objective which rotates in unison with the movement of the band. The light-rays emanating from the pictures on the moving band pass through this prism and are deflected so as to produce on the screen a stationary image of each picture. It is essential, however, to the perfect working of such a machine that the condenser, the picture, the prism, and the objective should always be in exact alinement. Should the pictures, therefore, not be evenly spaced, these relations will be disturbed and the result will be an imperfect matting of the images on the screen—that is to say, they may be too high or too low, so that parts of two images are simultaneously thrown on the screen. To provide a ready means for adjusting the position of the pictures at any time so that the images will be properly matted is one of the objects of our present invention, and this we accomplish by maintaining a positive connection between the band and the feed mechanism and constructing the latter with a capability of a limited movement independently of the driving mechanism or train of gearing by which it is impelled and providing a means by which it may be turned in either direction relatively to the driving mechanism, so as to advance or retract any given picture or series of pictures in the field.

Another important object of our invention is to illuminate and expose one picture only at a time, which is desirable for the following reason: Since the band is moving continuously, portions of two successive pictures will be projected simultaneously except for very brief intervals; but as it is difficult to obtain pictures which register exactly or to feed a picture-band so that the pictures thereon will pass through precisely the same points in the field, where parts of two pictures are simultaneously projected they may not be exactly superposed on the screen. This produces a blurring effect. To obviate this objection we employ in connection with the traveling band a movable mat or opaque body with an opening therein through which one picture only is exposed. This mat is so designed as to expose each picture during a given part of its travel and to conceal the other pictures at the same time and may be constructed in many ways to effect this result.

Our invention further comprises certain details in the construction of the apparatus, which will be described by reference to the accompanying drawings.

Figure 1 is a side view of the apparatus; Fig. 2, a front view, and Fig. 3 a rear view, showing parts broken away. Figs. 4, 5, and 6 show details of the guiding, driving, and mat mechanisms, respectively.

The apparatus when used as a picture-exhibiting machine comprises two parts which we prefer to make independent—one the picture feeding and projecting apparatus proper, the other the lamp or source of light—and the condenser. The former is fixed to a suitable base 1, the latter mounted on a slide 30, an extension 31 of said base, and capable of transverse adjustment so that the lamp and condenser may be shifted from the normal position into line with an objective 2, mounted on a standard 3 on a slide 4, adjustable in guides in the base 1. In using these machines for public exhibitions it is customary before exhibiting a scene to throw out to the screen some announcement or descriptive title of the scene. To do this with our instrument, the lamp and condenser are moved over into line with the objective 2 and then moved back after the announcement has been thrown on the screen. The lamp and condenser may be of any suitable construction and are merely indicated in outline. The other and more important parts of the apparatus are mounted in any suitable manner, preferably in a metallic frame, and comprise among others the following devices: A main shaft 5, which may be turned by a crank or by a pulley driven by any suitable motor and which carries a spur-wheel 6. This latter meshes with a pinion 7 on a lower shaft 8 and imparts rotation to a sprocket-wheel 9, the teeth of which engage with correspondingly-spaced rows of perforations along each edge of the picture-band, and thus operate to feed said band continuously, unwinding it from a reel 10 and delivering it to a reel 11, which latter is rotated by a belt 12, connecting a pulley portion of the sprocket-hub with a similar pulley on the spindle, upon which the reel 11 is mounted in comparatively light frictional engagement.

The picture-band, which for greater clearness in the illustration of the mechanism is not shown, passes from the reel 10 over an idler or guide 13 and down between two closely-approached plates 14. After issuing from these latter it passes between an idler 15 and the sprocket 9, being held in contact and engagement with the latter by said idler. It then passes to the take-up reel 11. The plates 14 serve to keep the band flat and are provided with an opening through which the band is exposed. The idler 15 is a roller of hard rubber or wood, with grooves 21 22 in its opposite ends, in which project the teeth of the sprocket. The roller is mounted on arms 23, extending from a sleeve 24, mounted on a fixed spindle 61. An arm 25 extends downward from the sleeve 24 and forms one member of a toggle. The other member, 26, engages with a recess in a flat spring 27, secured to the base of the instrument, so that the idler 15 will be retained either in or out of engagement with the sprocket, according as it may be set. The action of the spring 27 is also to keep the idler in firm but yielding contact with the band when the apparatus is in use. As bands of different manufacture vary slightly in width and it is necessary to prevent any sidewise vibrations of the same, we use as the guide 13 a polished metal or other sleeve which is adjustable longitudinally on the fixed pin or rod 17 and has a stop or projection 18 at its inner end. This projection serves as a guide for one edge of the band. The guide for the opposite edge is a pivoted lever 16, which may be turned to engage with a notch 19 in the edge of plates 14 or removed therefrom to permit the introduction of a band between the plates or its removal therefrom.

The gear-wheel 6 engages with a pinion 28, mounted on a long stud 29. To this pinion is rigidly secured a sleeve 34, mounted on the stud or spindle 29 and carrying a prism 33 in such position as to receive the light-rays from the pictures exposed through the opening in plates 14. To effect this and to render it easy to remove and replace the prism without altering its relations to the other parts of the mechanism, we attach the prism to a metal plate 35, secured to the sleeve 34, which latter slides over the spindle 29. The pinion 28 on the sleeve 34 carries a pin 37, which enters a hole 38 in the spin-wheel 32 and serves to connect the driving mechanism with other parts of the apparatus hereinafter described. When the pin 37 registers with this hole in the wheel 32, the prism and other parts of the apparatus are in their proper relations. To maintain the sleeve 34 in engagement with the spin-wheel 32 and to permit its removal therefrom, we use a rod 36, having a threaded end which extends through the side of the frame, where it is engaged by a thumb-nut 39. The other end of said rod is formed or provided with a plate 40, which is adapted to be turned to engage with the disk 36 on the sleeve 34 and hold the latter in engagement with the spin-wheel 32 when the rod 38 is drawn up by the thumb-nut 39. A pin 41 extends from the side frame and enters a hole 42 in the plate 40 when the rod 38 is in position to maintain the prism-sleeve in engagement with the spin-wheel 32. This prevents any tendency to turn the rod 38; but when the thumb-nut 39 is lowered the said rod may be pushed in to disengage the plate 40 from the pin 41, when the rod may be turned to permit the withdrawal of the prism and its sleeve. The movement of the picture-band and that of the prism are so correlated that as each picture comes opposite the opening in the plates 14 the light-rays emanating from it and passing through the prism will be focused in the optical axis of the objective 42 and by the latter enlarged and projected upon the screen. Inasmuch as it is essential for good results that the center of the picture should have a fixed and definite relative position to the prism, it is often necessary to adjust the picture-band with reference to the latter which its positive engagement with the sprocket-wheel 9 might not permit. We avoid this difficulty, however, by the use of the following mechanism: The pinion 7 is mounted on or forms a part of a sleeve 43, which is loosely mounted on a thin sleeve 44, carrying the sprocket 9 and loosely mounted on the spindle 8. The width of the pinion proper is sufficient to permit of a limited longitudinal movement of the same on the sleeve 44 without losing mesh with the spin-wheel 6. In the sleeve 43 is a spiral slot 45, through which extends a pin or stud 46, set in the sleeve, from which construction it follows that a longitudinal movement of the pinion-sleeve will impart a partial rotation to the sprocket, so that the angular relation of the latter with reference to the pinion will be varied. In order to effect such adjustment at any time, we provide a bell-crank lever 47, which is pivoted at 48 to the base of the instrument and in a position to be easily reached for manipulation. The arm 49 of this lever is connected by a link 50 and a short rod 51 to the end of a rod 52, which slides longitudinally through a standard or guide 53. The other end of this slide-rod connects with a plate 54, which extends through a slot in the side frame and at its free end is formed or provided with a fork 55, the ends of which embrace the sides of the pinion 7. A flat spring 56 or other friction device bears against the plate 54 to hold the same in any position in which it may be set. By raising or depressing the lever 47 a corresponding longitudinal movement is therefore imparted to the pinion 7, with the result that the sprocket 9 is advanced or retracted to a corresponding extent with reference to the said pinion and the driving mechanism connected therewith. In this way the position of the pictures on the band relatively to the axis of the optical system is adjusted. This adjustment, it will be observed, may be made at any time, whether the machine is in motion or at rest.

Between the metal plates 57 57, which are supported in any suitable manner on or which form a part of the frame, are mounted the device which may be termed the "traveling mat" and the gearing for operating the same in unison with the picture-band. This mat, in the preferred form in which we use it, is a circular disk 58 of sheet metal centrally pivoted and connected by a train of spin-wheels 59 59 with a worm-shaft 60, which meshes with the wheel 32. The disk 58 is geared so as to make one complete revolution in the time required for one picture on the band to pass a given point, and it contains a slot of the exact width of a picture, extending over practically three hundred and sixty degrees, but spiral in form, beginning near the periphery and gradually approaching the center, as shown in Fig. 3. The height of the opening through the plates 57 and the guide-plates 14 being equal to that of the consecutive pictures, the portion of the disk 58 is so adjusted that at the instant when the line dividing two pictures is just midway of the said opening the lower picture is covered by the disk and the upper picture exposed by the advent of the slot, and as the slot gradually approaches the edge of the disk it will coincide with the descending picture until the end of the slot is reached and the top of the picture has just reached the middle line of the exposure-opening. The next picture will then be exposed through the slot, and so on. Thus it will be seen that no more than one picture is ever exposed at any given time, so that the image on the screen will be that of a given picture and not of parts of two pictures except during the extremely short interval when both pictures are opposite the exposure-opening. Even this might be avoided by shortening up the slot, so as to leave solid portions of the disk to cover both pictures for an instant; but this is not necessary and only cuts off light. A rotating disk or mat or one made in the form herein shown is not the only means of accomplishing the objects of this part of our invention, as any movable device which produces an opening which follows the moving picture during the period of its exposure or during such part thereof as may be necessary would be the equivalent of the specific device shown. Various reciprocating or oscillating movements may be readily devised for accomplishing the same result.

To prevent heat from the lamp injuring the picture-band, we provide a water-cell 62, which is supported on the rear plate 57.

Our improvements being of a wholly novel character both with respect to their construction and mode of operation, are not limited to the specific form shown. We would also state that the above-described apparatus, like others of its general class, may be used substantially without modification as a camera or means for taking a series of photographs of a moving object. In such case, however, the apparatus would be inclosed in a suitable dark box or casing, the lamp, condenser, and water-cell dispensed with, and a shutter used in case the exposure of successive portions of the film should be too prolonged.

What we now claim as our invention, and desire to secure by Letters Patent, is—

1. In a moving-picture apparatus the combination with mechanism for continuously moving a picture band or surface, and an optical system for compensating for such movement by projecting the images of the pictures to the same point, of a device having an aperture of dimensions to expose a single picture and movable in unison with the band so as to expose the pictures to the optical system singly and during a portion of their travel through the field, as set forth.

2. In a moving-picture apparatus, the combination with mechanism for continuously moving a picture-band, and an optical system for deflecting the rays of light from successive pictures to a fixed point, of a device movable in unison with the band for exposing the pictures to the optical system singly and during a portion of their travel through the field, as set forth.

3. In a movable-picture apparatus, the combination with mechanism for continuously moving a picture-band, and an optical system for deflecting the rays of light from successive pictures to a fixed point, of a mat or opaque body having an aperture which follows the movements of the pictures through a portion of their travel so as to expose the pictures to the optical system singly and in succession, as set forth.

4. In a moving-picture apparatus, the combination with mechanism for continuously moving a picture-band, and an optical system for deflecting the rays of light from successive pictures to a fixed point, a rotatable disk intermediate to the picture-band and the optical system and having a slot which affords an aperture of sufficient width to expose a single picture and of such form as to follow the movements of the pictures through a portion of their travel, as set forth.

5. In a moving-picture apparatus, the combination with a mechanism for continuously moving a picture-band, and a rotatable prism for deflecting the rays of light from successive pictures to a fixed point, of a rotatable disk intermediate to the picture-band and the prism and containing an aperture which follows the movements of the pictures and exposes them singly and in succession, as set forth.

6. In a moving-picture apparatus, the combination with mechanism for continuously moving a picture-band and a rotatable prism for deflecting the rays of light from successive pictures to a fixed point, of a rotatable disk intermediate to the picture-band and the prism and having a spiral slot through which the pictures are exposed singly and in succession, as set forth.

7. The combination in a moving-picture apparatus with the parts forming a channel through which the picture-band passes while being exposed, of an idler or guide 13, having a limiting-stop for the edge of the band and transversely adjustable with respect to the line of travel, and a removable limiting-stop 16 for the opposite edge of the band.

8. The combination with the band-feeding mechanism, the rotatable prism, and a mat having an aperture which follows the movement of the pictures, of a driving mechanism common to the band-feeding mechanism and the mat and geared therewith, as set forth.

HARRY N. MARVIN.
HERMAN CASLER.

Witnesses:
A. E. JOHNSTONE,
ARTHUR G. PREVIN.